United States Patent
Jones

(10) Patent No.: US 9,927,261 B1
(45) Date of Patent: Mar. 27, 2018

(54) INDUCTIVE SENSOR DEVICE FOR USE WITH A DISTANCE MEASUREMENT DEVICE

(71) Applicant: Sagentia Ltd., Cambridge (GB)

(72) Inventor: Ross Peter Jones, Cambridge (GB)

(73) Assignee: SAGENTIA LTD., Cambridge (GB)

( * ) Notice: Subject to any disclaimer, the term of this patent is extended or adjusted under 35 U.S.C. 154(b) by 0 days.

(21) Appl. No.: 15/274,870

(22) Filed: Sep. 23, 2016

(51) Int. Cl.
    *G01D 5/20*     (2006.01)
    *G01B 7/14*     (2006.01)

(52) U.S. Cl.
    CPC ......... *G01D 5/2053* (2013.01); *G01D 5/2066* (2013.01)

(58) Field of Classification Search
    CPC .. G01D 5/2053; G01D 5/2066; G01D 5/2046; G01D 5/34776; G01D 5/2455; G01D 5/249; G01D 5/2086; G01D 5/66; G01B 7/14; G01B 3/205
    USPC .................................................. 324/207.24
    See application file for complete search history.

(56) References Cited

U.S. PATENT DOCUMENTS

| | | | | |
|---|---|---|---|---|
| 6,531,866 | B2 * | 3/2003 | Miyata | G01D 5/2086 324/207.12 |
| 6,534,970 | B1 | 3/2003 | Ely et al. | |
| 7,705,585 | B2 | 4/2010 | Howard | |
| 2006/0076949 | A1 * | 4/2006 | Kawatoko | G01D 5/2053 324/207.17 |

* cited by examiner

*Primary Examiner* — Jay Patidar
(74) *Attorney, Agent, or Firm* — Fitch, Even, Tabin & Flannery LLP

(57) ABSTRACT

An inductive sensor device includes a scale unit (24) containing field elements (26) that cooperate with a transmit circuit (32) to create a field pattern (S(x)) in measuring direction (M). A sensor unit (25) contains at least one receive circuit (34) with at least one receive coil (35), respectively. The sensor unit (25) and the scale unit (24) can move relatively in measuring direction (M). The coil loops (37) of the at least one receive coil (35) and/or the scale loops (28) of the scale elements (26) are separated into a loop front (56) and a loop back (57), each containing a sectional portion that runs alternately with regard to the height direction. The alternating run can be obtained by combining linear and/or curved portions so that a meandering, zigzag, sinusoidal, or another arbitrary alternating run can be obtained.

14 Claims, 7 Drawing Sheets

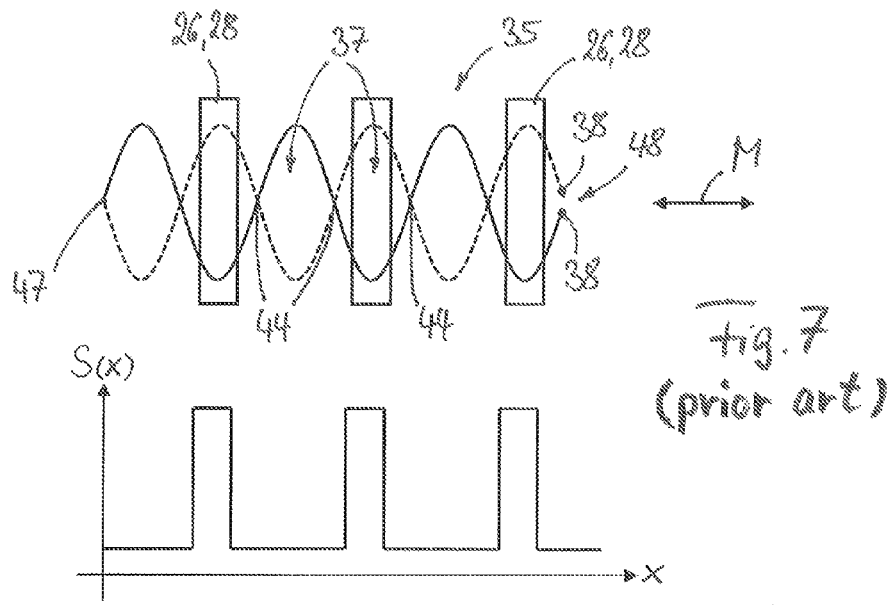
fig. 7 (prior art)
fig. 8
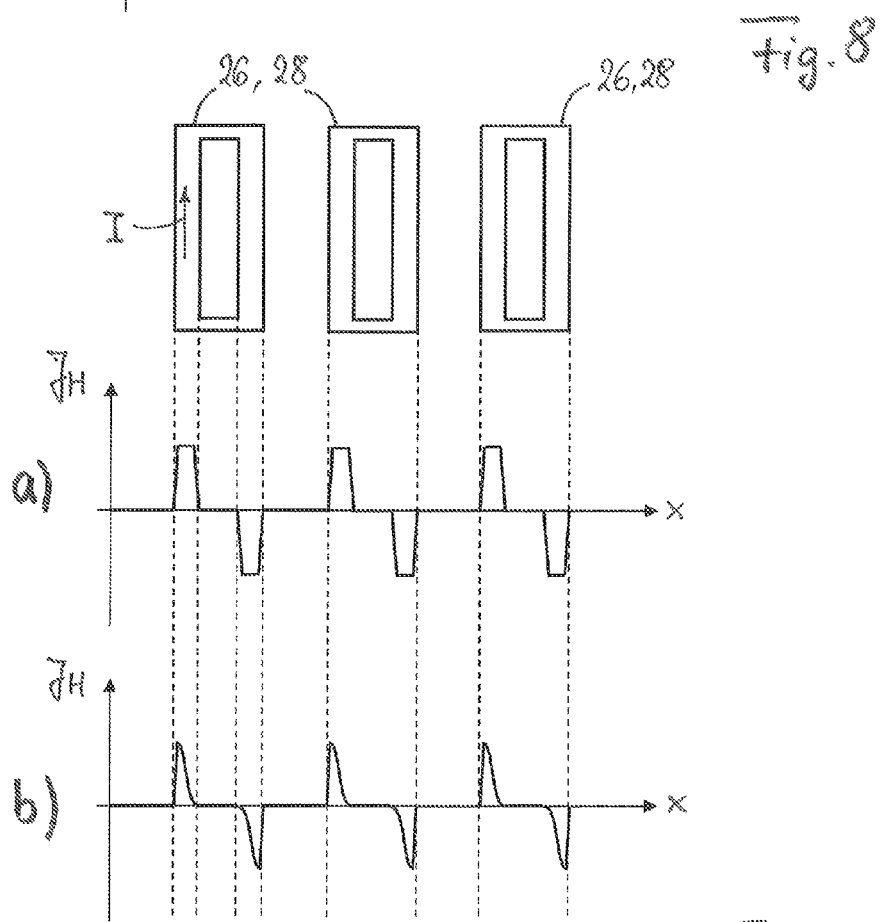
fig. 9

INDUCTIVE SENSOR DEVICE FOR USE WITH A DISTANCE MEASUREMENT DEVICE

TECHNICAL FIELD

The present invention refers to the technical field of inductive sensor devices. Such inductive sensor devices can be used for determination of a relative position between two parts that are movable relative to each other in a linear and/or circular direction. Such inductive sensor devices can be used for measuring instruments like calipers, micrometer gauges, test indicators, touch probes and other measuring instruments.

BACKGROUND

U.S. Pat. No. 6,534,970 B1 discloses a rotary position detector containing a scale unit that is arranged around the rotation axis. The measuring direction of such a rotary position detector is a circular part around the rotation axis. A scale unit contains groups of scale loops wherein these groups are distributed along the circular measuring path. Each group contains an outer loop that surrounds at least one inner loop. Each loop is formed by a conductor having two radial conductor sections that thus extend perpendicular to the measurement direction and two circumferential conductor sections that extend parallel to the measurement direction around the rotation axis. Such nested loop structures shall be less sensitive to misalignment between the scale unit and a sensor unit that moves along the circular measurement path.

U.S. Pat. No. 7,705,585 B2 discloses a detector for measuring relative position in a linear measuring direction. It contains a scale unit and a sensor unit that is movable with regard to the scale unit in the measuring direction. The sensor unit contains an antenna comprising a transmit coil and two receive coils that are displaced in the measuring direction. Each receive coil has two loops that are arranged next to each other in a transverse or height direction perpendicular to the measuring direction. One loop of each receive coil is positioned above the scale unit and the other loop is positioned distant to the scale unit. Accordingly, the magnetic field created by the transmit coil is modified in the range of one loop of each receive coil, whereas the flux through the respective other loop corresponds mainly to the far field. In so doing any disturbance due to a magnetic far field that might be present, is eliminated. The receive signal detected by means of the receive coils thus only depends on the coupling between the transmit coil, the scale unit and the receive coil. Each loop of the receive coils has a rectangular shape. The field elements arranged along the measuring direction at the scale unit can have different shapes like rhombuses, circuits or polygons.

SUMMARY

The present invention refers to an inductive sensor device that provides a field pattern in a measuring direction and a sensor unit that is movable relative to the created field pattern and provides a receive signal for position determination. If all components are ideal, a displacement in a transverse or height direction perpendicular to the measuring direction would not have a remarkable influence in the accuracy of the position determination. However, usually at least one receive coil provided in the sensor unit is not ideal. For example, in many applications the at least one receive coil has conductors or conductor sections in at least two layers of a circuit board. Because the distance between the layers and the scale unit is different, the coupling of receive coil portions contained in the different layers differs as well. Moreover, at least at one location of the receive coil terminals are provided for measuring the induced receive voltage. At this location the receive coil contains an irregularity.

As a consequence, a real receive coil provides a receive signal that adds harmonics to the fundamental frequency in the spatial frequency domain. This can lead to errors in the position detection.

Sometimes such errors can be determined and reduced by calibrating the inductive sensor device. In fact such calibration is limited, because the error depends on the magnitude of the displacement between the sensor unit and the scale unit, which can vary depending on the relative position between the scale unit and the sensor unit in measuring direction.

It is thus an object of the present invention to provide an improved inductive sensor device that is less sensitive to off-axis displacement in at least one direction perpendicular to the measuring direction and that has an improved linearity.

The inductive sensor device comprises a scale unit and a sensor unit. The scale unit is adapted to create a field pattern in a measuring direction. In one preferred embodiment the scale unit comprises field elements that contain electrical conductive material and are particularly formed by scale loops. The field elements are preferably passive field-influencing elements that vary or modify a magnetic field created by means of a transmit coil in order to provide the field pattern. In another embodiment the field elements could be loops of a long coil extending in measuring direction and providing a respective field pattern. In such a case, an additional transmit coil is not necessary.

A sensor unit is provided that contains at least one receive circuit having at least one receive coil respectively. The sensor unit and the scale unit are movable relative to each other in the measuring direction. The at least one receive coil contains coil loops that are arranged adjacent to each other in the measuring direction. The field elements contain scale loops. Preferably each field element is formed by one scale loop. The scale loops are arranged adjacent to each other in the measuring direction.

Each coil loop and each scale loop extends in a respective plane spanned by the measurement direction and the height direction. As mentioned above, the height direction is perpendicular to the measurement direction. A reference plane extends perpendicular to the measurement direction. Each coil loop and each scale loop surrounds a respective loop area.

According to the invention, each of the coil loops and/or each of the scale loops are separated by means of a respective reference plane. The reference plane extends perpendicular to the measuring direction. The reference plane separates the respective loop into a loop front and a loop back. The loop front and the loop back have specific shapes and comprise:

- at least two first loop sections that limit a first zone of the loop area having a first height that increases from an outermost endpoint; and
- at least two second loop sections that limit a second zone outside and directly adjacent to the loop area having a second height that increases from an innermost endpoint.

The outermost endpoint is formed by the two first loop sections and the innermost endpoint is formed by the two second loop sections respectively. At the endpoints the loop sections can form corners or can create a tangential transition. The first height of the first zone increases at the loop front from the outermost endpoint toward the loop back in measuring direction. Similarly the first height of the first zone increases at the loop back from the outermost endpoint toward the loop front in measuring direction. The second height increases at the loop front from the innermost endpoint away from the loop back in measuring direction. Similarly the second height of the second zone increases at the loop back from the innermost endpoint away from the loop front in measuring direction.

A portion or section of the conductor forming the loop front or the loop back runs alternately with view in the height direction and can have a meander and/or zigzag and/or curved shape.

Preferably the loop front and the loop back containing the first and second loop sections are free of loop sections that extend in height direction.

Accordingly, a transverse current density in the respective coil loops and/or scale loops, measured in the transverse or height direction, contains a smaller amount of gradient or slope compared with loop sections of rectangular loops that extend in height direction. Due to the meandering and/or zigzag-shaped loop front and loop back, the spatial frequency of the transverse current density contains less amounts of harmonics and thus errors in the position detection can be reduced.

Preferably nested scale loops and/or coil loops are omitted.

In one preferred embodiment each coil loop is formed by a first conductor and/or a second conductor arranged on a circuit board. The first conductor and the second conductor are provided preferably on different layers of the circuit board. Each of the conductors can have a non-interrupted run in the respective layer or maybe divided in conductor sections that are connected by means of respective conductor sections of the other conductor.

Preferably the coil loops and the scale loops have different shapes. More preferably all of the coil loops have identical shapes and similarly all of the scale loops—apart from deviations due to providing terminals at one location—have identical shapes.

Preferably the number of first zones limited by the first loop sections and the number of second zones limited by the second loop sections is equal in one common loop front or one common loop back.

More preferably the respective all of the first zones have equal area amounts. Similarly all of the second zones can have equal area amounts.

In one embodiment the first loop sections and/or the second loop sections can be formed by linear and/or curved conductor portions. It is further preferred that the loop front and the loop back of the same loop have the same shape. This means that if the loop front would be shifted in measuring direction onto the loop back, both loop front and loop back would coincide with each other.

The reference plane that intersects respective coil loop or scale loop creates preferably two intersection points, so that in height direction between these intersection points the height of the respective loop has a maximum amount. The reference plane can be formed by a midplane extending through the middle of the loop with regard to the measuring direction.

In a preferred embodiment the at least one receive coil has coil loops that are symmetric with regard to a longitudinal axis extending in measuring direction. Each loop can have a sinusoidal shape on one side of the longitudinal axis and a respective mirrored shape on the other side of the longitudinal axis. Each loop is preferably formed by conductors or conductor sections that extend in at least two different layers of a circuit board.

Preferably a transmit circuit containing at least one transmit coil is provided. The transmit circuit with the transmit coil is adapted to create a magnetic field. The field pattern in measuring direction can be created by means of the scale element that form field-influencing elements and modify the magnetic field detected by means of the at least on receive coil accordingly. In such an embodiment the scale elements are preferably passive field-influencing elements. Each scale element can be formed by means of one scale coil.

It is possible to provide separate, electrically non-connected scale coils that are arranged adjacent to each other in measuring direction in at least one line.

In an alternative embodiment it is also possible to connect the scale loops of one common line in series. In so doing it is possible to have identical current amounts in all of the scale loops. Connecting the scale loops in series can require to arrange the scale loops in at least two different layers on a circuit board of the scale unit.

In one preferred embodiment the transmit circuit is part of the sensor unit. More preferably the at least one transmit coil surrounds the at least one receive coil of the respective assigned receive circuit. If more than one line of scale coils is provided, for each line of scale coils a respective transmit coil and a respective at least one receive coil can be provided.

Preferred embodiments of the present invention are disclosed in the dependent claims, the specification and the drawings. In the following, preferred embodiments of the invention are explained in more detail referring to the attached drawings. In the drawings:

BRIEF DESCRIPTION OF THE DRAWINGS

FIG. 7 is a schematic illustration of a receive coil and scale elements according to the prior art, FIG. 8 shows schematically a field pattern created by means of the scale elements shown in FIG. 7, FIG. 9 shows the transverse current density of the scale elements of FIG. 7.

DETAILED DESCRIPTION

Figure 1:
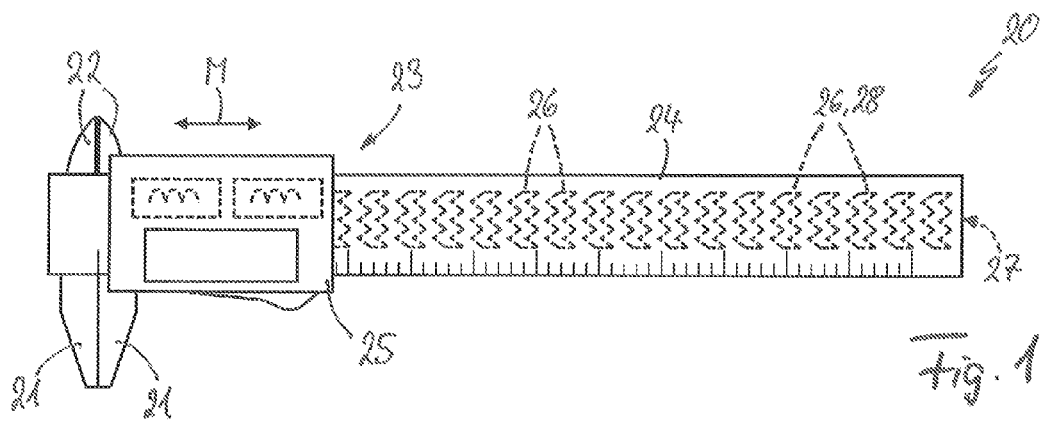
FIG. 1 shows a schematic top view of a measuring instrument that can be equipped with an inductive sensor device.

FIG. 1 shows a schematic illustration of an exemplary measuring instrument 20 in form of a caliper. The caliper is realized as a digital caliper for measuring a distance between inside jaws 21 and/or outside jaws 22 of an object. The distance is measured by means of an inductive sensor device 23. The inductive sensor device 23 includes a scale unit 24 and a sensor unit 25 that are movable relative to each other in a measuring direction M. The scale unit 24 contains a number of scale elements 26 that are arranged in at least one line 27 extending in a measuring direction M and adapted to create a field pattern S(x) (FIG. 8) in measuring direction M.

In the preferred embodiment the scale elements 26 contain electrically conductive material. The scale elements 26 are not connected with each other in the present embodiment, but are separate non-connected elements. As schematically shown in the drawings, each scale element 26 is formed by a scale loop 28 and particularly by one single scale loop 28. The scale elements 26 or scale loops 28 respectively are in the present example passive field-influencing elements and create the field pattern S(x) by varying or modifying a magnetic field B.

According to preferred embodiments, the inductive sensor device 23 and preferably the sensor unit 25 contain a transmit circuit 32 having at least one transmit coil 33 for creating the magnetic field B and at least one receive circuit 34. Each receive circuit 34 contains at least one receive coil 35. Preferably for each line 27 of scale loops 28 a respective transmit coil 33 and a respective receive circuit 34 is provided. The lines 27 and the respective transmit coils 33 and receive circuits 34 can be arranged adjacent to each other in a height direction H perpendicular to the measuring direction M. The height direction H and the measuring direction M span a plan parallel to which the scale loops 28 extend.

Figure 2:
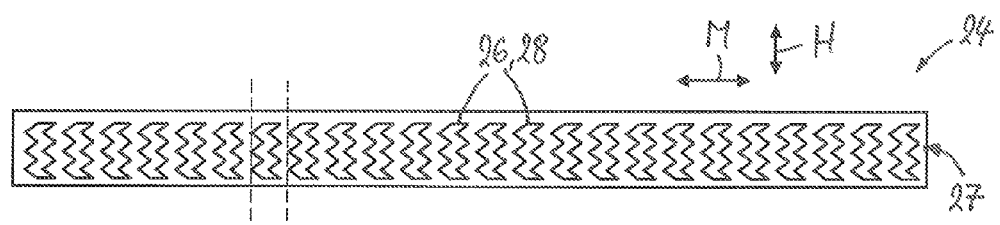
FIG. 2 shows a schematic top view of one embodiment of a scale unit containing scale elements.

As shown in FIG. 2, directly adjacent scale loops 28 are arranged in a regular pattern in measuring direction M defining a scale pitch p or scale wavelength. The scale pitch p corresponds to the sum of the dimension of a scale loop 28 in measuring direction M and the gap between two directly adjacent scale loops 28 in measuring direction M.

Figure 3:
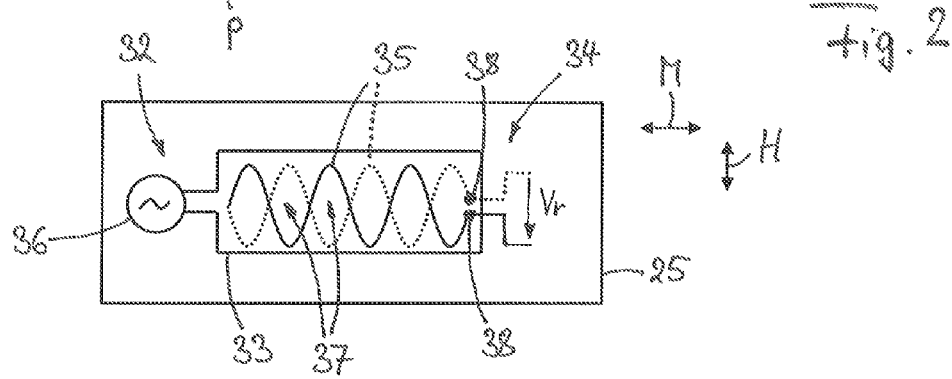
FIG. 3 is a schematic illustration of an embodiment of a sensor unit containing a transmit circuit and a receive circuit.
Figure 5:
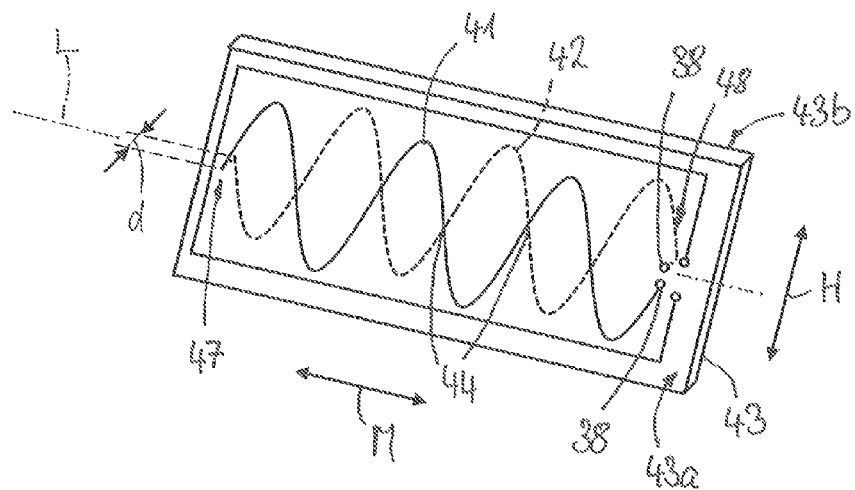
Figure 6:
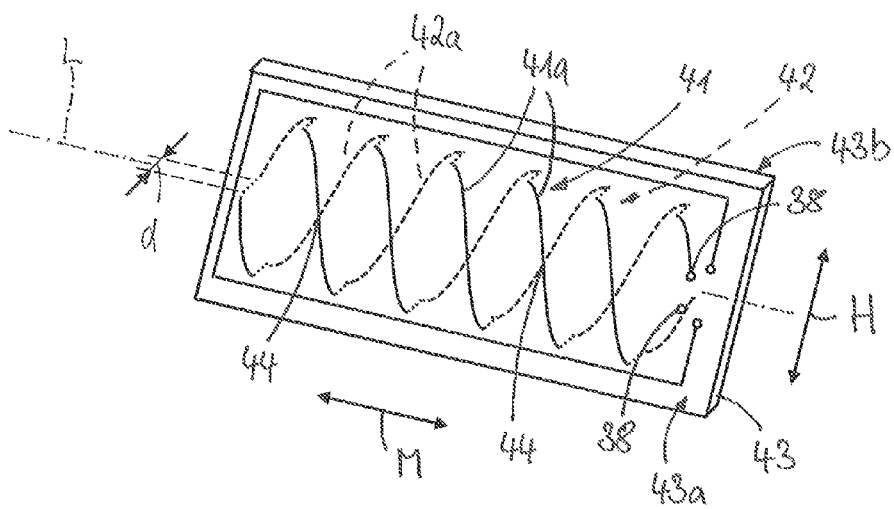

The transmit coil 33 of the transmit circuit 32 extends in a plane spanned by the measuring direction M and the height direction H. In this plane the transmit coil 33 surrounds the at least one receive coil 35, as schematically illustrated in FIGS. 3, 5 and 6. The transmit coil 33 can have a rectangular contour or may have any different shape that might be adapted to the outer contour or envelope of the at least one receive coil 35.

An AC voltage source 36 is connected or connectable to the transmit coil 33. Due to the alternating current, the magnetic field B (FIG. 4) is created. The magnetic field B has circular field lines around the conductor of the preferably single loop of the transmit coil 33. The direction of the field lines depend on the direction of the current through the transmit coil. The at least one receive coil 35 comprises a number of loops 37 that are arranged adjacent to each other in measuring direction M. The magnetic field B creates a magnetic flux through these loops 37 of the at least one receive coil 35. Accordingly, a receive voltage Vr is induced between terminals 38 of the receive coil 35. This receive voltage Vr forms a receive signal that depends on the relative position between the receive coil 35 and the scale unit 24. The magnetic field B from the transmit coil 33 induces very little signal in the receive coil 35 in the absence of the scale elements 26 or scale loops 28. Accordingly, the receive voltage Vr changes as the sensor unit 25 moves in measuring direction M along the scale unit 24. This receive signal can be used in the receive circuit 34 to determine the actual relative position between the sensor unit 25 and the scale 24. Depending on the design of the inductive sensor unit 23, either a relative or an absolute position determination is possible.

Figure 4:
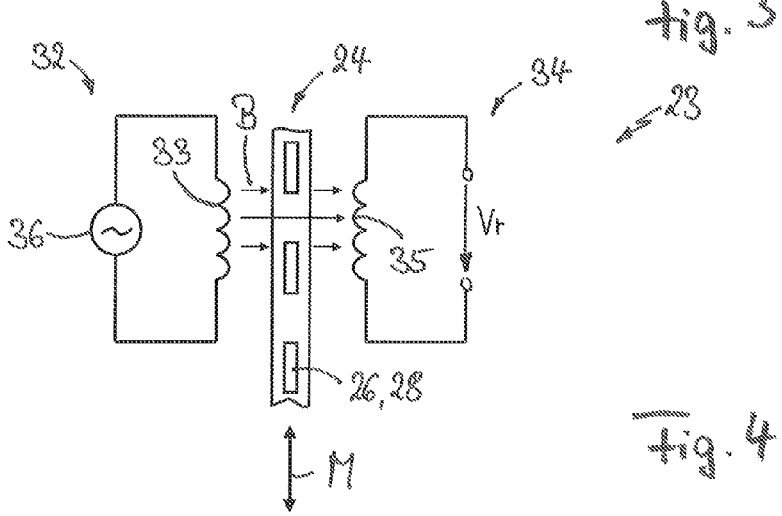
FIG. 4 is a diagram schematically illustrating the function principle of an inductive sensor device, FIGS. 5 and 6 each show a schematic illustration of one exemplary receive coil containing conductors or conductor sections provided in different layers of a circuit board.
Figure 1A:
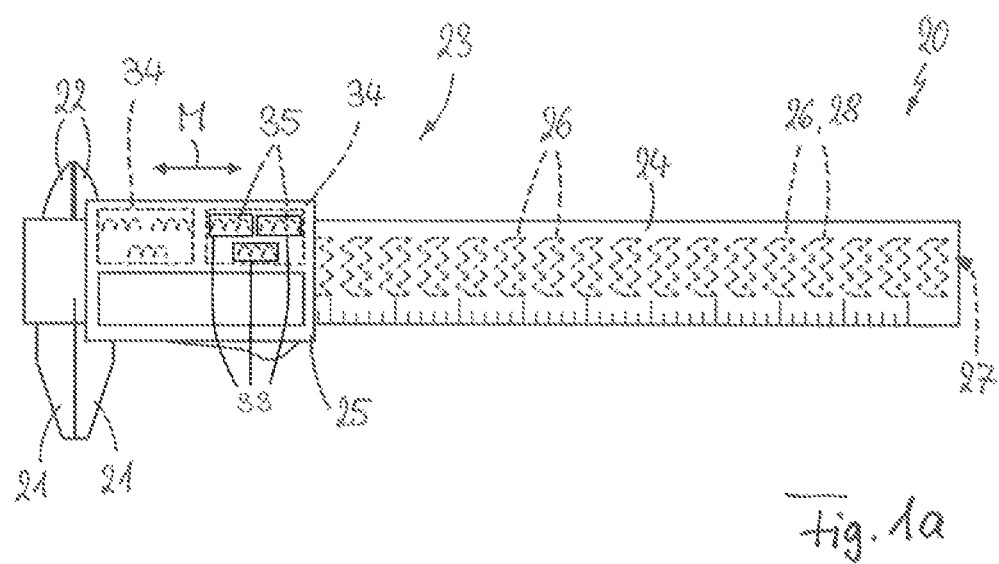
FIG. 1a shows a schematic top view of a measuring instrument having more than one transmit coil 33 and more than one receiving coil 35.

The basic operating principle is illustrated in FIG. 4. The magnetic field B created by the transmit coil 33 couples with the receive coil 35, wherein the coupling and thus the induced receive voltage Vr depends on the position of the scale elements 26 or scale loops 28 in the magnetic field B that affect the coupling.

Different to the illustrated preferred embodiments of the inductive sensor device 23, it is not necessary that the length of the line 27 of the scale elements 26 is longer than the length of the transmit coil 33 and/or the at least one receive coil 35. It is for example also possible that the transmit coil 33 is provided at the member having a longer extension in measuring direction M and that a member that moves along a measuring direction M contains a number of field-influencing scale elements 26. The key feature is that a field pattern S(x) is created along which the at least one receive coil 35 moves and detects the field pattern S(x) for position determination.

As illustrated in one example in FIG. 5, the at least one receive coil 35 can be formed by a first conductor 41 and a second conductor 42, wherein the conductors 41 and 42 are provided on different layers 43a and 43b of a circuit board 43. Each of the conductors 41, 42 has an alternating run with regard to a longitudinal axis L that extends in measuring direction M. The conductors 41, 42 cross each other at crossing locations 44 that are arranged on the longitudinal axis L with view in a direction perpendicular to the measuring direction M and to the height direction H, which means perpendicular to the plane in which the circuit board 43 extends. In this viewing direction the two conductors 41, 42 create the loops 37 of the at least one receive coil 35. Between two directly adjacent crossing locations 44 one coil loop 37 is present. It is noted that the conductors 41, 42 run in different layers 43a and 43b and are not electrically connected at the crossing locations 44. The distance between two directly adjacent crossing locations 44 in measuring direction M corresponds to a half wavelength w of the receive coil 35 (compare FIG. 10).

The wavelength w is preferably equal to the pitch p of the scale loops 28, which leads to larger amplitudes of the receive voltage Vr.

The conductors 41 and 42 are short-circuited at a first end 47 of the receive coil 35. At the upper, second end 48 with regard to the measuring direction M, the terminals 38 of the receive coil 35 are provided. The receive coil extends in measuring direction M between the first end 47 and the second end 48. To short-circuit the conductors 41 and 42 or to connect one of the terminals 38 with a respective conductor in the other layer, vias can be used.

In FIG. 5 each of the conductors 41 and 42 have a continuous run between the first end 47 and the second end 48 in one of the layers 43a and 43b. Different to that FIG. 6 schematically illustrates an alternative embodiment. The first conductor 41 provided in the first layer 43a is separated into first conductor portions 41a. Two first conductor portions 41a directly adjacent to each other in measuring direction M are electrically connected by one second conductor portion 42a of the second conductor 42 provided in the other layer 43b of the circuit board. In this embodiment the number of vias that are necessary to create the receive coil is higher than in the example of FIG. 5. The advantage of this design is that two or more receive coils 35 can be interleaved, enabling a ratiometric measurement to determine position. The basic shape of the loops 37 and the receive coil 35 corresponds to the example of FIG. 5. Each loop 37 is substantially symmetric with regard to the longitudinal axis L. At one side of the longitudinal axis the coil loop 37 has a sinusoidal contour, created by the run of the respective portion of at least one conductor 41, 42. At the other side of the longitudinal axis L the contour of the coil loop 37 is mirror symmetric. In other words, each coil loop 37 is created by a positive half wave and a mirror symmetric negative half wave of a sinusoidal run of at least one conductor 41, 42 on the respective sides of the longitudinal axis L.

As schematically shown in FIGS. 5 and 6, the two conductors 41, 42 or their respective conductor sections 41a, 42a are displaced by a distance d that corresponds to the distance of the layers 43a and 43b of the circuit board 43. This displacement by the distance d is one aspect why the real receive coil 35 deviates from the ideal design. One of the layers 43a or 43b respectively has a distance to the scale loops 28 that is larger by the distance d. Accordingly, the coupling is reduced compared with those conductors 41, 42 or conductor portions 41a, 42a that are provided in the other layer with a smaller distance to the scale loops.

Another aspect which makes the receive coil 35 deviate from the ideal design is that one of the loops, in the present example the coil loop 37 adjacent to the second end 48, has an opening between the terminals 38. This loop is thus not completely closed in circumferential direction.

In practice, due to manufacturing tolerances and the limiting aspects mentioned above, an off-axis displacement between the receive coil 35 and the scale loops 28 in height direction H—and also in normal direction with regard to the plane defined by the measuring direction and the height direction H—affects the coupling between the receive coil 35 and the field pattern created by the scale loops 28 that modify the magnetic field B and thus a position detection error is created. The present invention provides a coil or loop design that reduces or eliminates such an off-axis displacement error for the position determination.

In FIG. 7 an arrangement according to the prior art is shown. The receive coil 35 has coil loops 37 created by sinusoidal and/or co-sinusoidal conductors or conductor sections. The scale loops have a rectangular shape. FIG. 8 shows a field pattern S(x) created by means of the scale loops 28 shown in FIG. 7. The position in measuring direction M is indicated by the position variable x. In the present example the position variable x corresponds to the position of the sensor unit 25 along the scale unit 24.

Due to the magnetic field B, a voltage is induced in the scale loops 28 arranged in the magnetic field B. This creates a current I that flows within the respective scale loop 28, as schematically illustrated in FIG. 9. This current I has a transverse current density $J_H$. The transverse current density $J_H$ is a current density in height direction H transverse to the measuring direction M. As shown in FIG. 9a, this transverse current density $J_H$ has a peak-like or rectangular signal shape depending on the dimension (thickness) of the conductor forming the scale loop 28 in measuring direction M. However, this signal has steeply rising and sloping flanks. In the spatial frequency domain such a transverse current density creates harmonics additionally to the fundamental frequency. These harmonics affect a precise position determination.

In FIG. 9b the transverse current density is shown for higher temporal frequencies of the current I that lead to a skin effect in the scale loops 28. The problem of the added harmonics is the same as described above due to the steep flanks of the signal.

Figures 13, 14, 15:
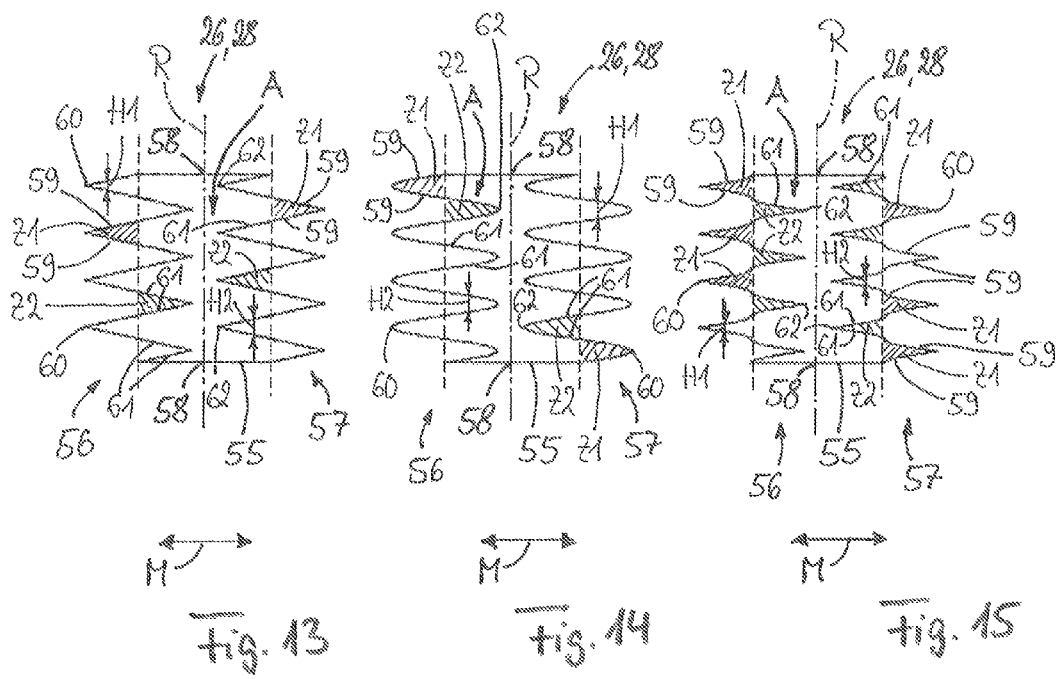

In order to overcome this problem the scale loops 28 and/or the coil loops 37 according to the present invention have a specific design. Three exemplary embodiments of a scale loop 28 are shown in FIGS. 13, 14 and 15. Each scale loop 28 surrounds a respective loop area A. The loop area A is enclosed by a scale conductor 55 forming the scale loop 28. A reference plane R extends perpendicular to the measurement direction M. The reference plane R intersects the scale loop 28 and separates the scale loop 28 and the scale conductor 55 in a loop front 56 and a loop back 57. In the present embodiment the reference plane R has two intersection points 58 with the scale conductor 55.

Preferably the scale conductor 55 has a top section and a bottom section opposite each other in height direction H, wherein top section and a bottom section extend in measurement direction M directly adjacent to the respective intersection point 58 respectively. The height in height direction H along the reference plane R between the intersection points 58 corresponds in the exemplary embodiment to the maximum height of the scale loop 28.

The straight top and bottom sections of the scale conductor 55 are connected by means of an alternating front section and back section respectively that have an alternating run with regard to the height direction as schematically illustrated. Such an alternating section is provided in the loop front 56 and the loop back 57 respectively. Preferably these alternating sections have an identical run, which means that the alternating section of the loop front 56 could be shifted in measuring direction M until it coincides with the alternating section of the scale conductor 55 in the loop back 57.

More precisely each alternating section of the loop front 56 or the loop back 57 contain at least two first loop sections 59 that limit a first zone Z1 that is part of the loop area A surrounded by the scale conductor 55. The two first loop sections 59 are connected with each other at a corner-like or curved tangential transition location that forms an outermost endpoint 60. Starting from this outermost endpoint 60, the first zone Z1 has a first height H1 that increases with increasing distance from the outermost endpoint 60 in measuring direction M. In the loop front 56 the first height H1 increases from the outermost endpoint 60 toward the opposite loop back 57. Similarly from an outermost endpoint 60 in the loop back 57 the first height H1 of a respective first zone Z1 increases toward the loop front 56.

Additionally to the at least one first zone Z1, the loop front 56 and the loop back 57 contain at least two second loop sections 61 that limit a second zone Z2 outside the loop area A having a second height H2 that increases from an innermost endpoint 62 in measuring direction. For the at least one second zone Z2 in the loop back 57 the second height H2 increases away from the loop front 56 and similarly the second height H2 for each second zone Z2 in the loop front 56 increases away from the loop back 57.

Preferably the number of first zones Z1 and second zones Z2 is equal in the loop front 56 and similarly the number of first and second zones Z1, Z2 is equal in the loop back 57. In the preferred embodiments the first zones Z1 and the second zones Z2 are arranged alternately adjacent to each other in height direction H. This means that two first zones Z1 or two second zones Z2 do not directly contact each other, but that between two first zones Z1 one second zone Z2 is present or vice versa.

At the outermost and innermost endpoints 60, 62 where the respective first loop sections 59 or second loop sections 61 connect each other, a corner or point-like transition can be provided (FIGS. 13 and 15) or a tangential transition having a smooth curved shape can be created (FIG. 14).

Basically the number of first zones Z1 and second zones Z2 in each loop front 56 and loop back 57 can be selected as necessary or advantageous according to the specific sensor design. It is preferred when the first loop sections 59 and second loop sections 61 extend outside the innermost and outermost end points 60 and 62 inclined with regard to the height direction H and the measuring direction M, wherein the angle with the height direction is between 90° and 45° preferably. The first loop sections 59 and/or the second loop sections 61 can extend in a linear direction (FIG. 13) or have a curved shape (FIGS. 14 and 15). Their shape and thus the shape of the limited first and second zones Z1, Z2 defines the signal form of the transverse current density $J_H$.

Figure 10:
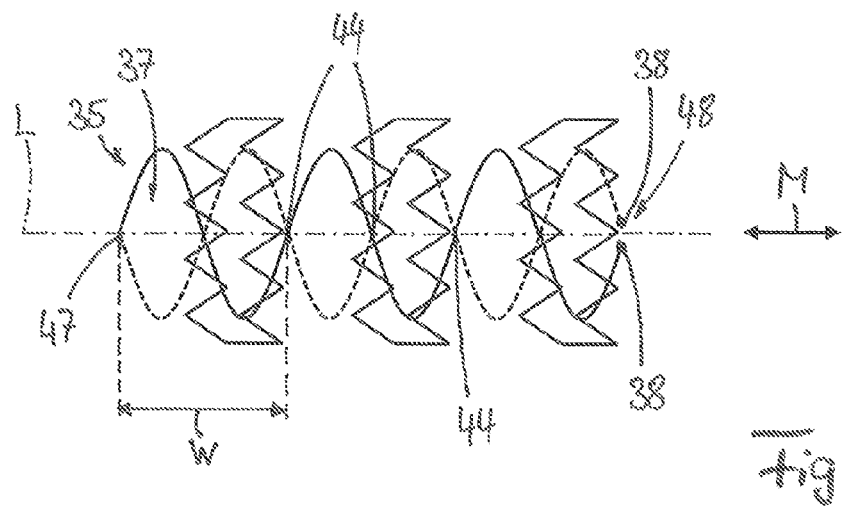
FIG. 10 shows schematically a receive coil and scale loops, wherein the scale loops have an inventive-shaped loop front and loop back.
Figure 11:
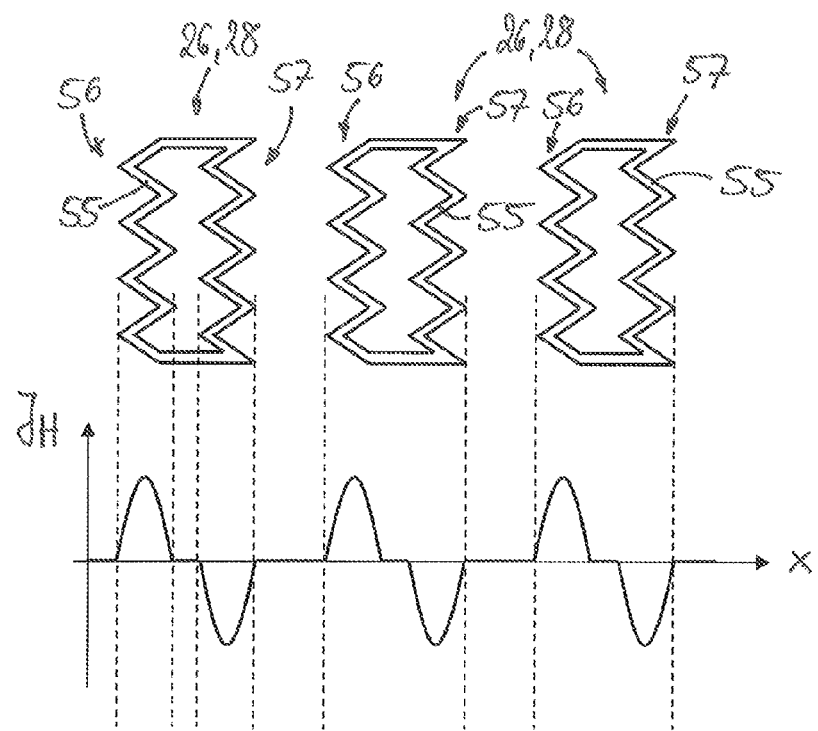
FIG. 11 shows a transverse current density of the scale loops shown in FIG. 10.
Figure 12:
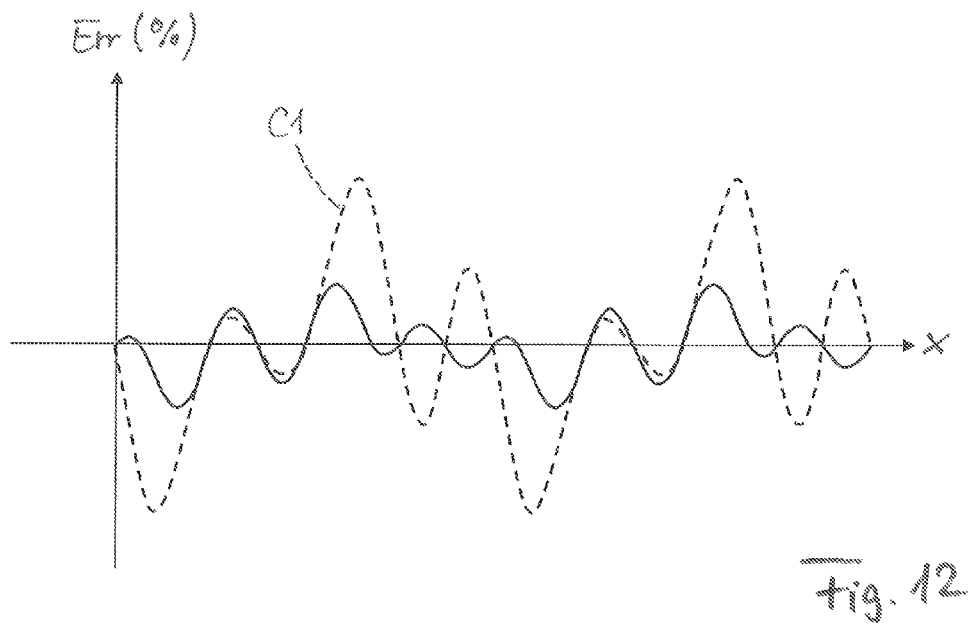
FIG. 12 shows a comparison of an error in position detection between an inductive sensor device according to the prior art and according to the invention, FIGS. 13-15 each show a schematic illustration of embodiments of scale loops according to the present invention

As schematically illustrated in FIGS. 10 and 11, due to the specific shape of the scale loops 28, the transverse current density $J_H$ has less steep flanks and can have substantially the form of positive or negative sinusoidal half waves, as shown in FIG. 11. This leads to a reduction in the number and/or amount of harmonics in the frequency domain. Accordingly the inductive sensor device 23, according to the present invention, is less sensitive to displacements in height direction H. This is schematically shown in FIG. 12 that illustrates the error (in %) along the position variable x in measuring direction. The first curve C1 illustrates the error using a rectangular scale loop 28, as shown in FIG. 7, and the second curve C2 (solid line) shows the error using the shape scale loops 28, as illustrated e.g. in FIGS. 10, 11 and 13-15.

Figure 16:
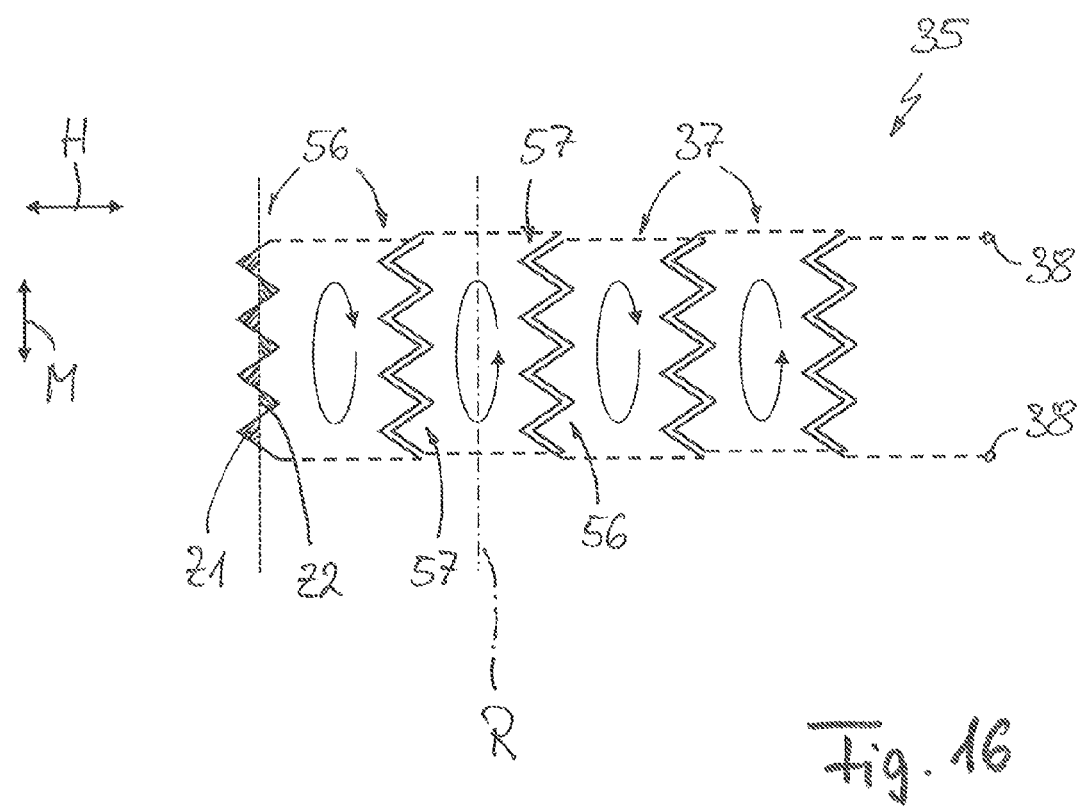
FIG. 16 shows a schematic illustration of an embodiment of a receive coil according to the present invention.

As an alternative or additionally to shaping the scale loops 28, it is also possible to use a similar shape of the coil loops 37, as schematically shown in FIG. 16. As can be seen, the coil loops 37 can also be separated in a loop front 56 and a loop back 57 having the shape as described above with regard to the scale loops 28 and particularly shown in FIGS. 13-15. The portions of the receive coil 35 shown in solid lines in FIG. 16 are provided in one layer of a circuit board and the dotted portions can be provided on a further layer of the circuit board. The arrows in FIG. 16 show the flowing direction of the induced current in the loops 37 of the receive coil 35.

The present invention provides an inductive sensor device 23 that is less sensitive to off-axial displacement in a height direction H transverse to a measuring direction M and concurrently provides good linearity. A scale unit 24 contains field elements 26 that cooperate with a transmit circuit 32 to create a field pattern S(x) in measuring direction M or else create such a field pattern S(x). A sensor unit 25 contains at least one receive circuit 34 with at least one receive coil 35 respectively. The sensor unit 25 and the scale unit 24 can move relatively in measuring direction M. The coil loops 37 of the at least one receive coil 35 and/or the scale loops 28 of the scale elements 26 are separated into a loop front 56 and a loop back 57. The loop back 57 and the loop front 56 each contain a sectional portion that runs alternately with regard to the height direction, wherein the alternating run can be obtained by combining linear and/or curved portions so that a meandering or zigzag or sinusoidal or another arbitrary alternating run can be obtained.

REFERENCE SIGNS 20 measuring instrument
21 inside jaws
22 outside jaws
23 inductive sensor device
24 scale unit
25 sensor unit
26 scale elements
27 line of scale elements
28 scale loop
32 transmit circuit
33 transmit coil
34 receive circuit
35 receive coil
36 voltage source
37 coil loop
38 terminal
41 first conductor
41a first conductor section
42 second conductor
42a second conductor section
43 circuit board
43a layer of the circuit board
43b layer of the circuit board
44 crossing location
47 first end of receive coil
48 second end of receive coil
55 scale conductor
56 loop front
57 loop back
58 intersection point
59 first loop section
60 outermost end point
61 second loop section
62 innermost end point
A loop area
d distance of layers
H height direction
H1 first height
H2 second height
I current
$J_H$ transverse current density
L longitudinal axis
M measuring direction
p scale pitch
R reference plane
w wavelength of the receive coil
x position variable in measuring direction
Z1 first zone
Z2 second zone

The invention claimed is:
1. Inductive sensor device (23) comprising:
a scale unit (24) having scale elements (26) configured to create a field pattern (S(x)) in a measuring direction (M),
a sensor unit (25) comprising at least one receive circuit (34), wherein the at least one receive circuit (34) include at least one receive coil (35) respectively, wherein the sensor unit (25) and the scale unit (24) are moveable relative to each other in the measuring direction (M), wherein the at least one receive coil (35) contains coil loops (37) that are arranged adjacent to each other in measuring direction (M), wherein the scale elements (26) contain or are formed by scale loops (28) that are arranged adjacent to each other in measuring direction (M), wherein the coil loops (37) and the scale loops (28) extend in a respective plane spanned by the measurement direction (M) and a height direction (H) that extends perpendicular to the measurement direction (M), and the coil loops (37) and the scale loops (28) surround a respective loop area (A), wherein the coil loops (37) and/or the scale loops (28) are separated by a respective reference plane (R) extending perpendicular to the measuring direction (M) into a loop front (56) and a loop back (57), wherein both, the loop front (56) and loop back (57) comprises respectively:

at least two first loop sections (59) that limit a first zone (Z1) of the loop area (A) having a first height (H1) that increases from an outermost end point (60), and at least two second loop sections (61) that limit a second zone (Z2) outside the loop area (A) having a second height (H2) that increases from an innermost end point (62).

2. Inductive sensor device according to claim 1, wherein at least one of the coil loops (37) or the scale loops (28) surround a non-rectangular loop area (A).

3. Inductive sensor device according to claim 1, wherein the coil loops (37) are formed by at least one of a first conductor (41) or a second conductor (41) arranged on a circuit board (43).

4. Inductive sensor device according to claim 1, wherein the coil loops (37) and the scale loops (28) have different shapes.

5. Inductive sensor device according to claim 1, wherein a number of first zones (Z1) and second zones (Z2) is equal in one loop front (56) or wherein a number of first zones (Z1) and second zones (Z2) is equal in loop back (57).

6. Inductive sensor device according to claim 1, wherein the respective loop area of the first zones (Z1) are equal or wherein the respective loop area of the second zones (Z2) are equal.

7. Inductive sensor device according to claim 1, wherein at least one of the first loop sections (59) and at least one of the second loop sections (61) are formed by at least one of linear or curved conductor portions.

8. Inductive sensor device according to claim 1, wherein the loop front (56) and the loop back (57) have a same shape.

9. Inductive sensor device according to claim 1, wherein the reference plane (R) intersects a corresponding coil loop (37) of the coil loops (37) or a corresponding scale loop (28) of the scale loops (28) at two intersection points (58), so that a height of the corresponding coil loop (37) or the corresponding scale loop (28) has a maximum amount between the intersection points (58).

10. Inductive sensor device according to claim 1, wherein the at least one receive coil (35) has symmetric coil loops (37) of the coil loops (37) that are symmetric with regard to a longitudinal axis (L) extending in the measuring direction (M).

11. Inductive sensor device according to claim 1, further comprising a transmit circuit (32) comprising at least one transmit coil (33) configured to create a magnetic field (B) and wherein the scale elements (26) are passive field influencing elements provided to influence the magnetic field (B) of the transmit coil (33) to create the field pattern.

12. Inductive sensor device according to claim 11, wherein the transmit circuit (32) is part of the sensor unit (25).

13. Inductive sensor device according to claim 11, wherein the at least one transmit coil (33) surrounds the at least one receive coil (35) of one corresponding receive circuit (34) of the at least one receive circuit (34).

14. Inductive sensor device according to claim 12, wherein the at least one transmit coil (33) surrounds the at least one receive coil (35) of one corresponding receive circuit (34) of the at least one receive circuit (34).

* * * * *